United States Patent [19]

d'Iribarne et al.

[11] Patent Number: 4,826,522

[45] Date of Patent: May 2, 1989

[54] METHOD AND APPARATUS FOR MAKING CONTACT-TEMPERED GLASS SHEETS WITH REINFORCED EDGE STRESSES

[75] Inventors: Benoit d'Iribarne, Aachen; Paul Houang, Paris, both of France

[73] Assignee: Saint-Gobain Vitrage "Les Miroirs", Courbevoie, France

[21] Appl. No.: 150,191

[22] Filed: Jan. 29, 1988

[30] Foreign Application Priority Data

Jan. 29, 1987 [FR] France .................................. 87 01063

[51] Int. Cl.$^4$ .................................................. C03B 27/04
[52] U.S. Cl. .......................................... 65/115; 65/95; 65/103; 65/104; 65/351
[58] Field of Search ................... 65/95, 103, 106, 115, 65/349, 351, 104; 428/192, 410

[56] References Cited

U.S. PATENT DOCUMENTS

| | | | |
|---|---|---|---|
| 2,068,799 | 1/1937 | Guyer | 65/115 |
| 3,278,287 | 10/1966 | Leflet et al. | 65/103 |
| 4,075,381 | 2/1978 | Furukawa et al. | 65/115 X |
| 4,508,783 | 4/1985 | Aubry et al. | 65/115 X |

FOREIGN PATENT DOCUMENTS 984881 3/1985 United Kingdom .................. 65/115

*Primary Examiner*—Robert L. Lindsay
*Attorney, Agent, or Firm*—Oblon, Fisher, Spivak, McClelland & Maier

[57] ABSTRACT

The invention relates to the tempering of sheets of glass and optionally their bending by the so-called contact process. It proposes a process in which the edge stresses of the glass sheets are reinforced by cooling the edges of the glass sheets in relation to their central zone, particularly by blowing on these edges with a cooling gas. It also proposes a device to perform this preferred cooling of the edges, as well as glass sheets thus tempered. The invention applies to the production of glazings having nonfragile edges, particularly for the automobile.

12 Claims, 2 Drawing Sheets

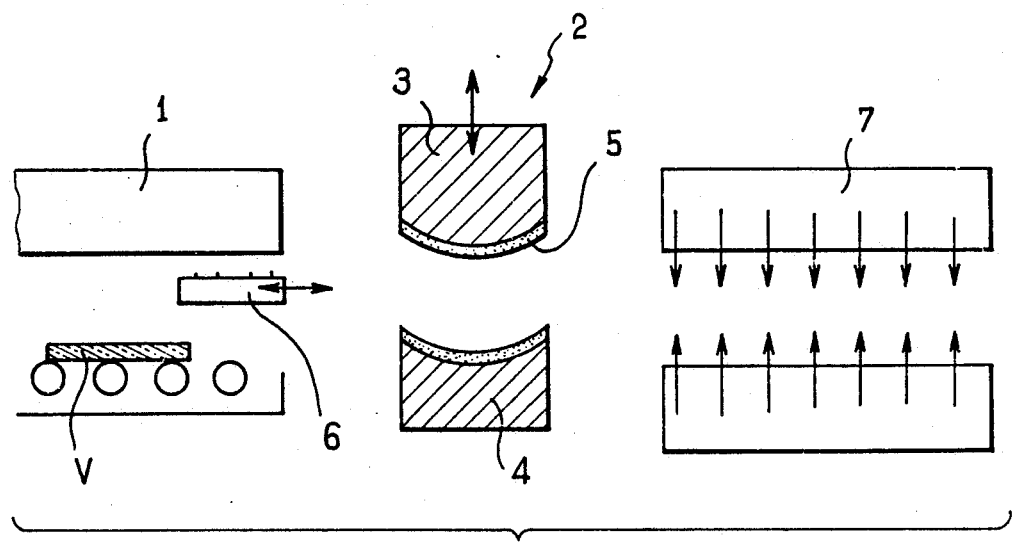
FIG_1
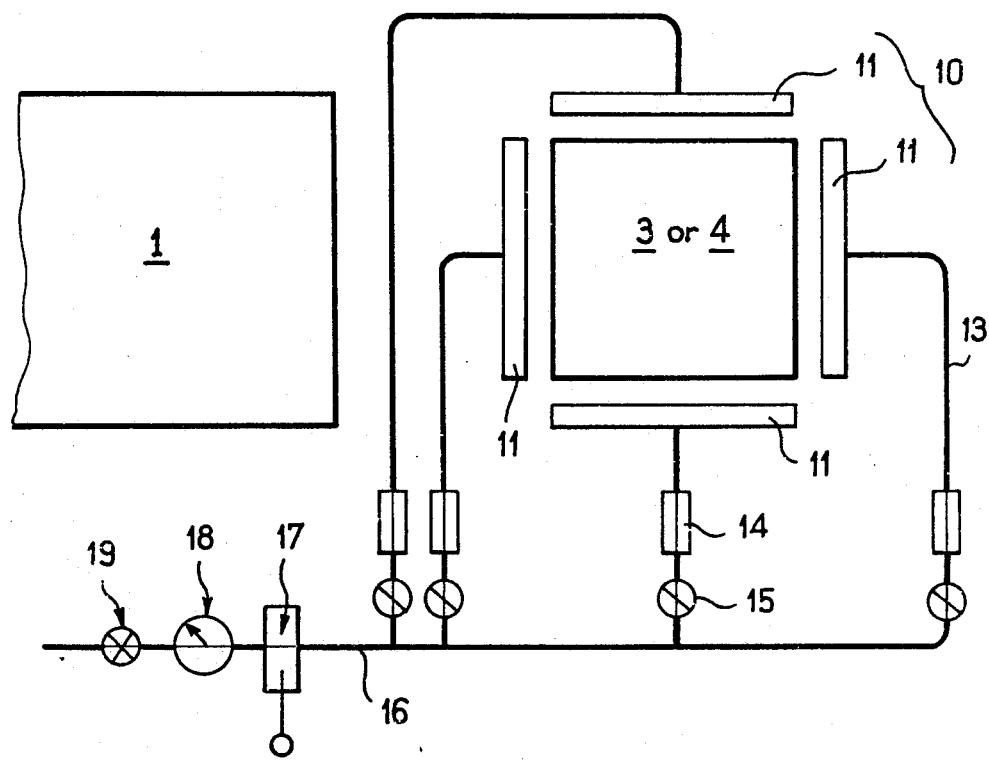
FIG_2

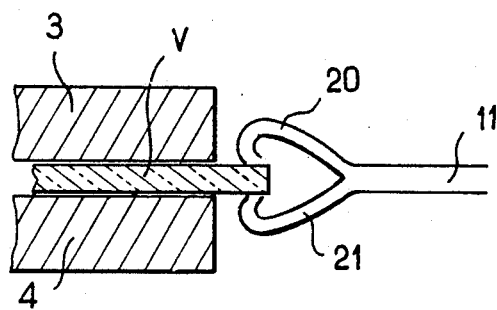
FIG_3A
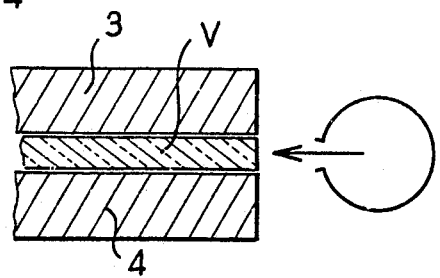
FIG_3B
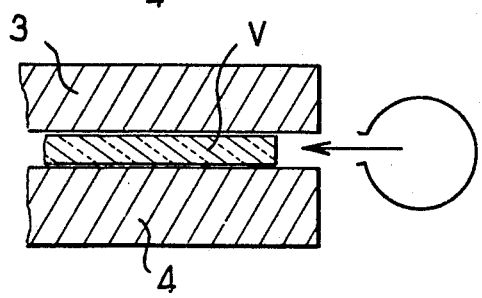
FIG_3C

METHOD AND APPARATUS FOR MAKING CONTACT-TEMPERED GLASS SHEETS WITH REINFORCED EDGE STRESSES

BACKGROUND OF THE INVENTION

1. Field of the Invention

The invention relates to the tempering of glass sheets, and optionally their simultaneous bending by the so-called contact process and it relates more particularly to the particular treatment of the edges of the glass sheets during this tempering, optionally accompanied by a bending.

2. Background of the Related Art

In a tempering of glass in air, i.e., by blowing cold air on a glass sheet heated to its tempering temperature, the cooling is the greatest and the heat exchange is the best on the edges of the glass. There result, on the edges of glass tempered in air, compression stresses on the entire thickness of the glass and up to a certain distance from the edges that are currently called "edge stresses." These stresses assure the strength and stability of this glass sheet, particularly during operations such as its mounting in an automobile window opening. Moreover, an impact applied to the edge of a glass sheet tempered in air generally causes only chipping. On the other hand, the same impact applied to the edge of a contact-tempered glass sheet can cause shattering. This is due to a fault inherent in the contact tempering process itself since the edge of glass is not cooled during the contact tempering.

Actually, in this contact tempering process, a glass sheet is cooled using cooling plates applied against all of its faces, either directly, or preferably with insertion of a heat and mechanical buffer material.

Thus along the faces of this gass sheet, cooling is facilitated by contact with the cooling plates or with the buffer material, but on the edge of this glass sheet this contact does not exist and edge stresses result that are too small in absolute value and/or exist over too small a depth, which is reflected by a fragility of the glass sheet thus tempered to any impact on its edges.

SUMMARY OF THE INVENTION

This invention has as its object the solving of this problem.

A further object of the invention is to provide a process which makes possible a sufficient tempering of glass sheets on their edges.

Yet a further object of the invention is to provide glass sheets not having the edge found in the sheets of the prior art, which are contact-tempered and optionally bent.

To do this it proposes a contact process of tempering and optionally bending in which the temperature of the edges of the glass sheets is lowered in relation to their center, this relative lowering of temperature being performed before and/or during the pressing of the sheets, thus performing the tempering and optionally the bending by contact.

Before the pressing of the tempering and optionally the bending, this temperature difference between the edges and the center can be obtained during the heating of the glass sheet by placing heat masks in the furnace, and/or preferably by heating the center of the sheets, and/or by blowing a cooling gas, in particular air, especially compressed air, at selected regions of the sheet.

During the pressing of the tempering and optionally the bending, this difference between the edges and the center is obtained by blowing of a cooling gas, in particular air, especially compressed air.

The invention also proposes devices making it possible to obtain glass sheets having sufficient edge stresses.

It proposes, in particular, a contact tempering and optionally bending device comprising two cooling plates, preferably coated with a mechanical and thermal buffer material, intended to be applied against the faces of the glass sheets, and also comprising cooling means located to act on the edges of the glass sheets.

BRIEF DESCRIPTION OF THE DRAWINGS

The invention will now be described in greater detail with reference to the attached figures which represent:

FIG. 1 is a general diagram of a contact tempering-bending installation,

FIG. 2 is a plan diagram of the contact tempering-bending installation equipped according to the invention with means for blowing cooling gas on the edges of the glass during the bending-tempering pressing, and FIGS. 3A, 3B, 3C are detail views showing variants of the arrangement of the glass in relation to the cooling plates in the case of a blowing of cooling gas during pressing.

DETAILED DESCRIPTION OF THE PREFERRED EMBODIMENTS

FIG. 1 provides a general diagram of a contact bendingtempering installation. This installation comprises a furnace 1 for heating sheets, plates or glass sheets V. It also includes a tempering and optionally bending station 2 essentially formed of two cooling plates 3 and 4 optionally covered with a buffer material 5 that is both thermal and mechanical in buffer characteristics, a means 6 for support and transport of the glass sheets from furnace 1 to tempering and optionally bending station 2, particularly a roller and/or air cushion conveyor, or an upper, partial vacuum, transfer element that can move, for example, on rails (not shown). Advantageously, tempering and optionally bending station 2 is followed by a cooling station 7 in which the sheets of glass whose stresses have been set by pressing between plates 3 and 4, will complete their cooling, thus quickly freeing plates 3 and 4 for the pressing of another glass sheet.

According to an embodiment illustrated in FIG. 2, means 10 for cooling edges of glass sheets V are provided at tempering and optional bending station 2. These means 10 are, in particular, means for blowing a cooling gas, in particular air, especially compressed air.

These blowing means 10 can, for example, consist of tubular ramps 11 pierced with holes 12, blowing air in the direction of the edges of glass sheets V. These ramps 11 can each be fed by a feed pipe 13 equipped with a flowmeter 14 and a valve 15, all of these pipes 13 being connected to a common pipe 16 equipped with a pressure-reducing valve 17, a pressure gage 18 and a valve 19, this common pipe 16 being connected to the compressed air circuit.

Blowing means 10 of another type can, of course, be used. A gas other than compressed air can also be used without thereby modifying the invention.

To the extent that high edge stresses are desired on all the edges, blowing means 10 cover all the edges of glass sheets V. By edges of glass sheets V is meant not only the limits of the faces of the sheets at their periphery but also the limits of the faces of the sheets near a hole, a cut or a notch, made either in the proximity of the periphery of the glass sheets or in the central zones of said sheets, hole, cut, or notch being able, for example, to be used for the fastening of a locking unit, hinge pins, or various acessories.

Cooling plates 3 and 4 should keep free the edges of glass sheets V on which the blowing is provided. Said plates 3 and 4 can be slightly smaller than the glass sheets to be treated as illustrated in FIG. 3A thus freeing not only the edge of sheets V but also a narrow border of their faces on the order of several millimeters, for example 1 to 10 mm and in particular above 5 mm. In this configuration, blowing means 10 can have the shape provided in FIG. 3A, i.e., be divided into two nozzles 20 and 21 one blowing on the border of one face of glass sheet V, the other on the border of the other face, both blowing slightly in the direction toward the edge of said sheet V.

In another configuration, shown in FIG. 3B, cooling plates 3 and 4 and glass sheets V can have approximately the same dimensions.

In another possible configuration, shown in FIG. 3C, cooling plates 3 and 4 can slightly extend, by a few millimeters, beyond glass sheets V.

In each of the configurations, slight inaccuracies in the order of 1 or 2 mm on the positioning of sheets V in relation to plates 3, 4 will have almost no appreciable influence on the tempering results.

Various contact tempering-bending operations associated with a blowing on the edges have been conducted and have given rise to the indexed measurements below:

EXAMPLE 1 float glass sheets 3 mm thick.
temperature of sheets immediately before tempering: 650°
copper cooling plates 3 or 4 covered with a buffer material,
blowing ramps 11 each formed from a steel tube 10 mm in diameter, pierced with holes 2 mm in diameter at regular intervals of 12 mm, connected to a network of compressed air—distance of the blowing holes from the edge of the glass equal to 10 mm, in the configuration illustrated by FIG. 3B, i.e., the one in which plates 3 and 4 and glass sheets have the same size, ramps 11 blowing in the direction of the edge of glass,
pressure on the network of compressed air: 1 bar.

The blowing on the edges takes place during the application of the cooling plates against the glass sheets, i.e., during a time of at least 3 seconds, preferably at least 5 seconds to 10 seconds and which can even be much longer without harm to the quality of the sheets, only the rate of the process being restricted when this time is very long.
stresses of the edges obtained: 120 MPa,
surface compression stresses obtained: 130 MPa,
depth counted from the edges of the glass and for which the glass is in compression in its entire thickness: 3.5 mm.

EXAMPLE 2

Same operating conditions as in example 1, except:
glass blowing ramps distance: 6 mm,
edge stresses obtained: 150 MPa,
surface compression stresses obtained: 130 MPa,
depth counted from the edges of the glass and for which the glass is in compression in its entire thickness: 8 mm.

EXAMPLE 3

Same operating conditions as in example 1, except in regard to:
thickness of the glass: 4 mm,
distance of the blowing holes: 4 mm,
glass-blowing ramps distance: 16 mm,
edge stresses obtained: 140 MPa,
surface compression stresses: 125 MPa,
depth counted from the edges of the glass and for which the glass is in compression in its entire thickness: 5 mm.

By acting on the intensity of the blowing, it is possible to cause the value of the edge stresses to vary, these edge stresses being able, if it is desired, to be so great that they have a magnitude greater than that of the surface compression stresses, particularly higher by at least 30% to the extent that it is desired at the same time to preserve the quality of tempering known as "Securit" required for the use of the sheets thus tempered as automobile glazings. This "Securit" tempering is such that after fragmentation of the glass, at least 15% visibility exists in a central zone of at least 20 cm×50 cm, (i.e., the total of the surfaces of all fragments of at least 2 cm$^2$ should be at least 15% of the surface of the glass sheet), yet no fragment having, a surface greater than 16 cm$^2$, also such that the fragmentation in the peripheral zone is fine, i.e., that 40 to 350 fragments are counted in a square of 5 cm×5 cm, and that there are no silvers more than 7.5 cm long in this peripheral zone.

Sufficient edge stresses can be obtained by blowing during the contact tempering optionally combined with a bending, so as to obtain a lowering of the temperature of the edges in relation to that of the center. They can also be obtained by an action at the level of the heating of the glass to be tempered, i.e., a differentiated heating which makes it possible to bring the zone of the edges of the sheet to a temperature lower than the central zone. This is obtained by an increased heating of the central zone, or by a heating that is uniform but with interposition of heat masks on the edges and/or by cooling of the edges, for example for blowing of the type already described, but this time installed in the furnace for heating the glass.

Furthermore, the two actions, the one performed in the furnace before pressing, and the other performed in the tempering and optionally bending station, during pressing, can be combined.

Thanks to the invention, it is therefore, possible to obtain glass sheets exhibiting high edge stresses, at the very least such that the edges of the glass sheets are no longer particularly fragile regions. Contact tempering, reinforced on the edges thanks to a cooling of said edges, can also optionally be associated with a simultaneous bending able to impart to the glass sheets a great precision of shape, without clamp marks. Glass sheets thus produced can be used in all fields, in particular in that of the automobile.

In addition, it can also be noted that this tempering optionally accompanied by a bending, with cooling of the edges, can be performed both vertically and horizontally.

In addition, the invention further provides the possibility of an independent cooling from one edge to the next. Thus, if it is desired, it is possible to modulate the intensity or the period of the moment of the cooling from one edge to the next. This is particularly easy to perform when blowing is used.

Thanks to this, it is possible to obtain glass sheets having, on all their edges, sufficient edge stresses to prevent fragility, but having in addition on some edges only stresses greater than those which are only sufficient to prevent fragility, particularly, in order to respond, without damage to the glass sheet, to impacts or, in general to stresses, which may be exceptionally great on these particular edges. Of course, it is also possible to produce glass sheets having sufficient edge stresses along certain edges to prevent their fragility, but on the other hand, almost nonexistent or slighter on other edges that are known not to be subject to impacts or stresses which cause breaking.

In these preceding cases, when blowing is used, an action on valves 15 makes it possible to balance the edge stresses, from one edge to the next as desired.

Obviously, numerous modifications and variations of the present invention are possible in light of the above teachings. It is therefore to be understood that within the scope of the appended claims, the invention may be practiced otherwise than as specifically described herein.

We claim:

1. A process of contact tempering and bending a glass sheet which is heated to a tempering temperature, comprising the steps of:
   contacting surfaces of said glass sheet with cooling plates and thereby cooling said surfaces;
   bending said glass sheet;
   using cooling means for cooling edges of said glass sheets by blowing compressed air on said edges at a time before or during said contacting step, whereby control of edge stresses is increased.

2. Process according to claim 1 wherein said edge cooling step comprises blowing compressed air on said edges before said contacting step, wherein said cooling step is terminated when said edges reach a temperature which remains above the tempering temperature of the glass sheet.

3. Process according to claim 2 wherein said edge cooling step comprises interposing heat screens over said edges when said glass sheet is in a heating furnace.

4. Process according to claim 1 wherein said edge cooling step comprises blowing compressed air on said edges during said contacting step.

5. Process according to claim 4 wherein said blowing is performed over all of the edges of said glass sheet.

6. Process according to claim 1 wherein said edge cooling step comprises cooling different ones of said edges by different degrees.

7. Process according to claim 1 including a step of blowing cooling air over said surfaces after said contacting step.

8. Process according to claim 1 including bending said glass sheet during said contacting step.

9. An apparatus for tempering and bending of glass sheets, comprising:
   means for holding a glass sheet;
   two cooling and bending plates positionable on opposite sides of the glass sheet to be tempered for tempering and bending said glass sheet; and
   nozzles positioned for blowing cooling gas on at least one edge of a glass sheet being tempered by said cooling and bending plates, whereby said at least one edge is tempered with increased tempering control.

10. Apparatus according to claim 9 wherein said cooling and bending plates are sized such that said edges of the glass sheet project therefrom.

11. Apparatus according to claim 9 wherein said cooling and bending plates have the same size as the glass sheet to be tempered.

12. Apparatus according to claim 9 including thermal and mechanical buffer means on portions of said cooling and bending plates which contact the glass sheet to be tempered.

* * * * *